United States Patent
Kolar

(10) Patent No.: US 8,061,903 B2
(45) Date of Patent: Nov. 22, 2011

(54) BEARING ASSEMBLY WITH EXTENDED MAINTENANCE INTERVAL

(75) Inventor: Nicholas Michael Kolar, Chicago, IL (US)

(73) Assignee: Rexnord Industries, LLC, Milwaukee, WI (US)

( * ) Notice: Subject to any disclaimer, the term of this patent is extended or adjusted under 35 U.S.C. 154(b) by 39 days.

(21) Appl. No.: 12/695,629

(22) Filed: Jan. 28, 2010

(65) Prior Publication Data

US 2011/0182539 A1 Jul. 28, 2011

(51) Int. Cl.
*F16C 23/08* (2006.01)
*F16C 33/76* (2006.01)

(52) U.S. Cl. ........................................ 384/558; 384/484

(58) Field of Classification Search .................. 384/145, 384/146, 477, 484, 495, 496, 497, 498, 558
See application file for complete search history.

(56) References Cited

U.S. PATENT DOCUMENTS

| | | | | |
|---|---|---|---|---|
| 2,767,037 A | * | 10/1956 | Williams | 384/482 |
| 3,141,708 A | * | 7/1964 | Evangelista | 384/132 |
| 3,768,881 A | | 10/1973 | Bender et al. | |
| 4,755,067 A | * | 7/1988 | Asberg et al. | 384/482 |
| 4,763,905 A | | 8/1988 | Zvonar | |
| 4,808,012 A | | 2/1989 | Otto | |
| 4,872,770 A | | 10/1989 | Dickenson | |
| 5,002,406 A | | 3/1991 | Morton et al. | |
| 5,005,992 A | * | 4/1991 | Dreschmann et al. | 384/484 |
| 5,119,446 A | * | 6/1992 | Grafstrom et al. | 384/484 |
| 5,232,292 A | * | 8/1993 | Stackling et al. | 384/484 |
| 5,340,124 A | | 8/1994 | Jankowski et al. | |
| 5,441,351 A | * | 8/1995 | Grunze | 384/568 |
| 5,882,121 A | | 3/1999 | Saigusa | |
| 6,394,656 B1 | * | 5/2002 | Williams | 384/450 |
| 6,612,583 B2 | | 9/2003 | Donner | |
| 7,775,721 B2 | * | 8/2010 | Gietl et al. | 384/486 |
| 2005/0089254 A1 | * | 4/2005 | Takehara et al. | 384/484 |
| 2008/0050062 A1 | * | 2/2008 | Cook | 384/495 |
| 2010/0135606 A1 | * | 6/2010 | Ehlert et al. | 384/477 |

FOREIGN PATENT DOCUMENTS

| | | |
|---|---|---|
| EP | 0301731 A2 | 2/1989 |
| EP | 0577912 A1 | 1/1994 |
| JP | 2006300129 | 11/2006 |
| WO | 9826202 A1 | 6/1998 |

OTHER PUBLICATIONS

PCT International Search Report for PCT/US2010/041510 which claims priority to subject patent application; mailed Feb. 28, 2011; 3 pages.

* cited by examiner

*Primary Examiner* — Thomas R Hannon
*Assistant Examiner* — Adam D Rogers
(74) *Attorney, Agent, or Firm* — Quarles & Brady LLP

(57) ABSTRACT

A bearing assembly is disclosed including an inner race and an outer race that is radially spaced from the inner race for receiving roller elements therebetween. A collar is adjacent to and fixed relative to the inner race. A sealing member is fixed relative to the outer race. The sealing member slidably and sealingly engages the collar axially and radially to maintain a seal between the sealing member and the collar during a misalignment of the inner race relative to the outer race and a predetermined degree of misalignment of the inner race relative to the outer race.

20 Claims, 3 Drawing Sheets

BEARING ASSEMBLY WITH EXTENDED MAINTENANCE INTERVAL

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

This invention relates to a bearing assembly. In particular, this invention is directed at a seal structure in a bearing assembly which minimizes the internal contamination of the bearing assembly.

Conventionally, bearings include an inner race and a separate outer race which is movable relative to the inner race. To provide fluid rotation of the inner and outer races relative to one another, most bearings aim to smooth and/or minimize the frictional resistance between the components of the bearing. Often, this is achieved by selecting the bearing surfaces of the races and any intermediate bearing elements to have desirable tribological features (i.e., to have low coefficients of friction). In some cases, lubrication may also be provided between the bearing components.

However, when the space between the bearing surfaces becomes contaminated by debris or the like, the operation of the bearing degrades. After a sufficient amount of contamination, the bearing must then either be replaced or subjected to maintenance to clear the contamination. Both replacement and maintenance are costly and require downtime.

Complex bearings are particularly susceptible to contamination from the external environment. For example, in certain applications, a bearing may need to be operable in an misaligned condition in order to accommodate the connected surrounding structure. When conventional bearing structures are moved to operate in a misaligned condition, gaps may temporarily form between the bearing components due to uneven seals or the like, exposing the internal cavity of the bearing.

Hence, a need exists for bearing assembly that can operate in a misaligned condition while minimizing exposure of the internal cavity to contaminants.

SUMMARY OF THE INVENTION

This disclosure provides a bearing assembly with a sliding seal that permits the operation of the bearing assembly in a misaligned condition without compromising the quality of the seal. The sliding seal is formed between a specially shaped collar and a sealing member which radially and axially engages the collar. During operation of the bearing assembly, at least up to a predetermined degree of misalignment, the sealing member maintains a seal with the collar to prevent the ingress of debris and other contaminants that may adversely impact the performance of the bearing assembly.

A bearing assembly includes an inner race and an outer race. The outer race is radially spaced from the inner race for receiving roller elements therebetween. The bearing assembly further includes a collar adjacent the inner race which is fixed relative to the inner race. A sealing member is fixed relative to the outer race. The sealing member slidably and sealingly engages the collar axially and radially to maintain a seal between the sealing member and the collar during alignment of the inner race relative to the outer race and a predetermined degree of misalignment of the inner race relative to the outer race.

By shaping the collar appropriately, a seal is maintained during operation of the bearing assembly though a range of alignment positions. Further, as the sealing member contacts the collar with both an axial and a radial force consistently over the length of the seal, when the races are moved relative to one another, the movement of the components forming the seal are less likely to allow for the entrance of contaminants into the inner cavity.

These and still other advantages of the invention will be apparent from the detailed description and drawings. What follows is merely a description of a preferred embodiment of the present invention. To assess the full scope of the invention the claims should be looked to as this preferred embodiment is not intended to be the only embodiment within the scope of the claims.

DETAILED DESCRIPTION OF THE PREFERRED EMBODIMENT

Figure 1:
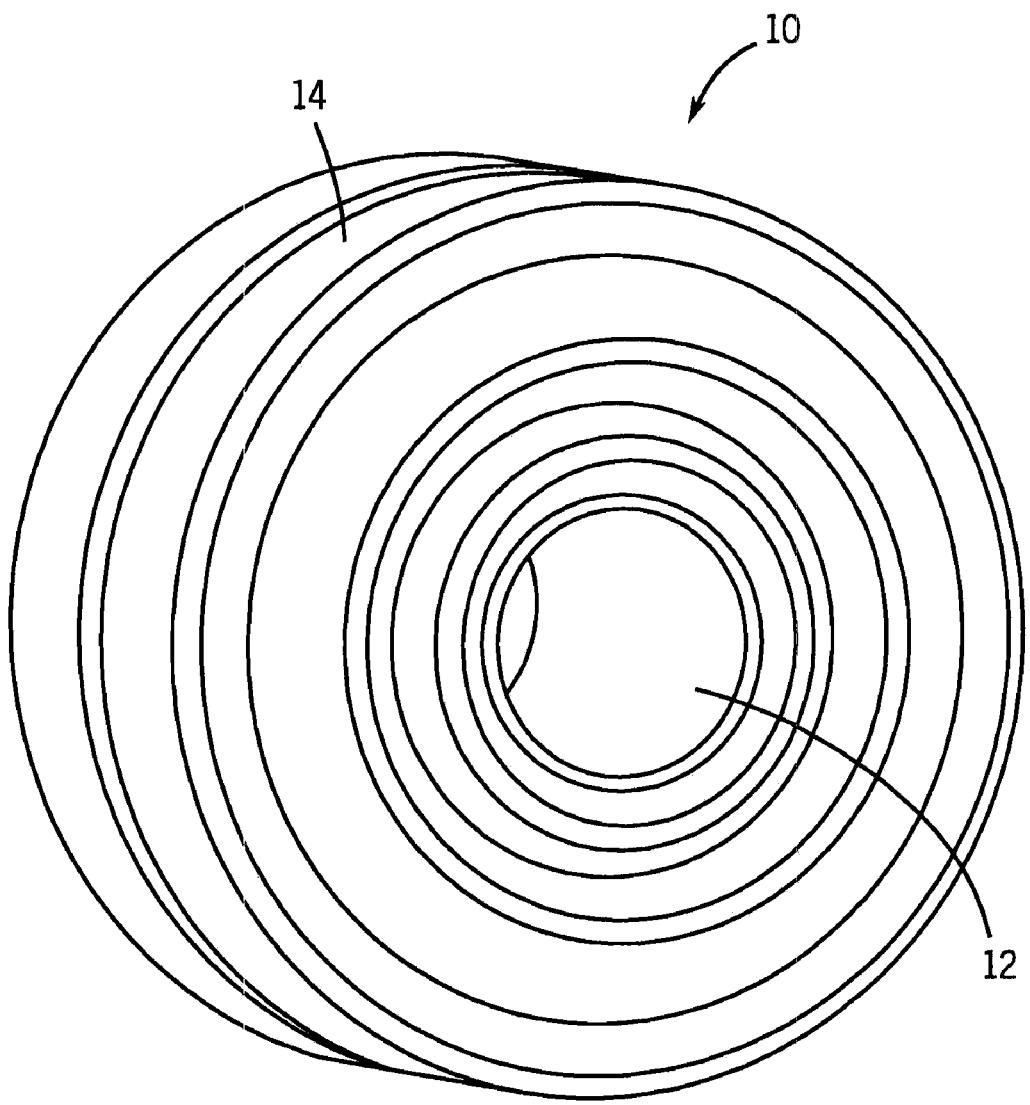
FIG. 1 is a perspective view of a bearing assembly.
Figure 2:
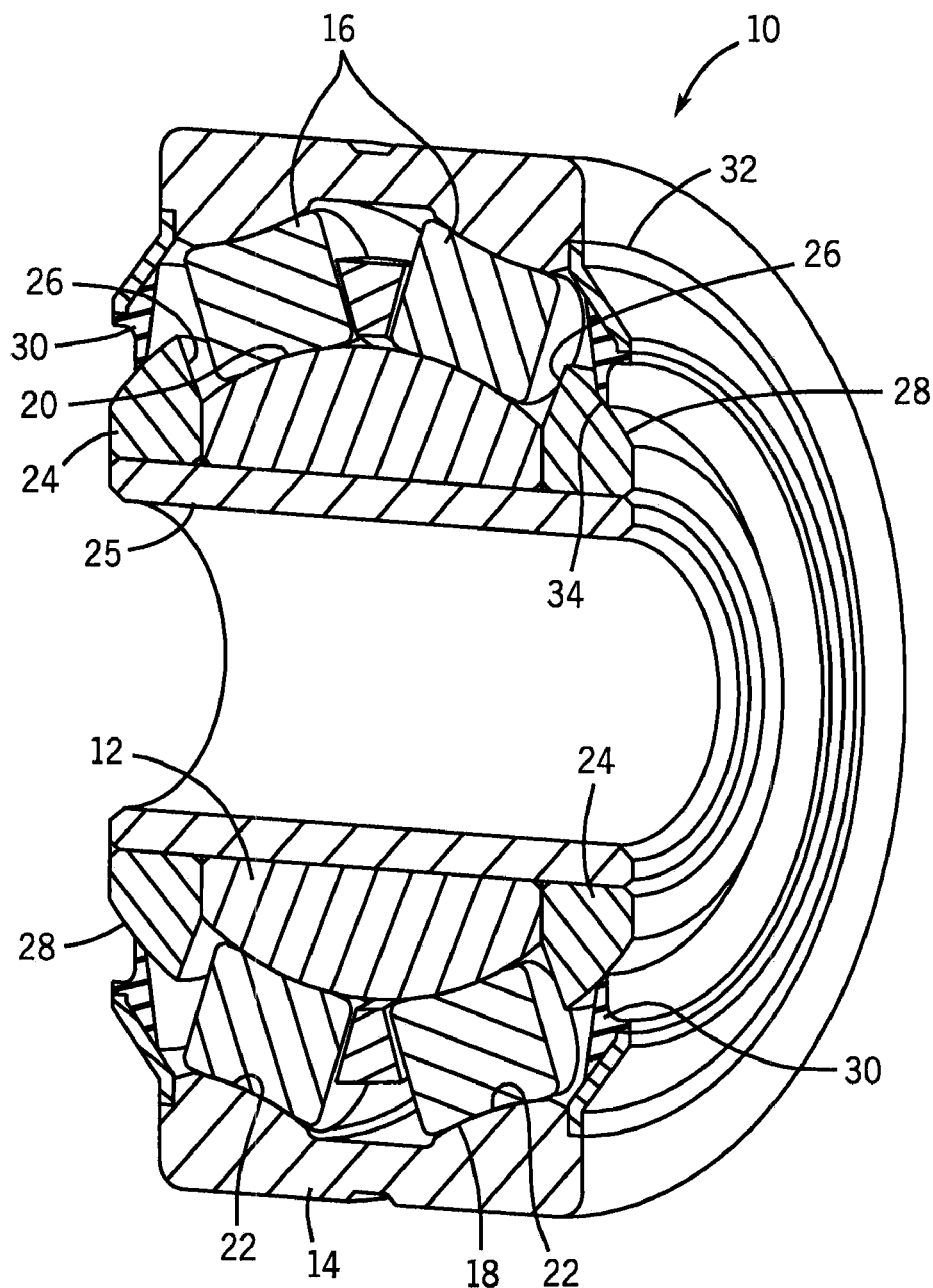
FIG. 2 is a cross-sectional perspective view of the bearing assembly of FIG. 1.

Referring first to FIGS. 1 and 2, a bearing assembly 10 is shown. The bearing assembly 10 is a roller bearing which may be suitable for use in any of a number of applications including, for example, in a flight control actuator of an aircraft.

The bearing assembly 10 includes an inner race 12, an outer race 14, and a plurality of roller elements 16 positioned between the inner race 12 and the outer race 14 in a double row annular configuration. The roller elements 16 are generally hourglass-shaped and each have a concave contact surface 18. This concave bearing surfaces 18 of the roller elements 16 engage both a convex bearing surface 20 on the inner race 12 that faces generally radially outward and further engages one of a pair of convex bearing surfaces 22 on the outer race 14 that face generally radially inward. The roller elements 16 are angularly inclined with respect to the central axis of the bearing assembly 10 such that the centrally-located ends of the roller elements 16 are a greater radial distance from the central axis of the bearing assembly 10 than the lateral ends of the roller elements 16.

As will be described in further detail below, the concavity of these bearing surfaces allow the bearing assembly 10 to operate in a misaligned position in which the central axis of the outer race 14 deviates from the central axis of the inner race 12. According to the disclosed structure, when the central axis of the outer race 14 tilts relative to the central axis of the inner race 12, the roller elements 16 tilt with the outer race 14 as the pair of convex bearing surfaces 22 in the outer race 14 are sized to roughly match the width of the roller elements 16, albeit with some room for play.

It will be appreciated that there may be other bearing structures that allow the misaligned operation of the bearing assembly 10. For this reason, the disclosed embodiment is intended to be illustrative, but not limiting.

In the form shown, the bearing assembly 10 has a double row annular configuration of roller elements 16 (i.e., there are two rings of roller elements 16 between the inner race 12 and the outer race 14). It is contemplated, however, that other configurations may be employed as well. For example, the bearing assembly may be of a single row annular configuration (i.e., there is only a single row of roller elements 16 between the inner race 12 and the outer race 14). Moreover, spacers or the like may be used to position the rolling elements 16 or rows of rolling elements 16 relative to one another.

A set of collars 24 are positioned adjacent the inner race 12 at the axial ends of the inner race 12. As best seen in FIG. 2, both the inner race 12 and the set of collars 24 are supported by a central shaft 25 that is tubular in shape.

Each of the collars 24 has a stop surface 26 which faces radially outward and axially inward. This stop surface 26 extends radially past the convex bearing surface 20 at the lateral ends of the inner race 12.

The stop surfaces 26 on the collars 24 ultimately prevent the central axis of the outer race 14 from exceeding a predetermined angle of misalignment with the central axis of the inner race 12. As noted above, the roller elements 16 travel side-to-side with the outer race 14, as the outer race 14 is tilted relative to the inner race 12. At least for the disclosed rolling element 16 configuration, this stop surface 26 prevents the lateral ends of the roller elements 16 from moving past the stop surface 26 of the collars 24 as the outer race 14 skews relative to the inner race 12. In one form, the geometric placement of the collars 24 relative to the inner race 12 and the roller elements 16 allows a maximum predetermined degree of misalignment between the central axis of the outer race 14 and the central axis of the inner race 12 to be 10 degrees.

Each of the collars 24 also have a sealing surface 28 which is an axially and radially outward facing surface. In the form shown, the sealing surfaces 28 are frusto-spherical in shape. However, as will be described below with reference to the functionality of the sealing surfaces 28, the sealing surfaces 28 may be differently shaped and still achieve the desired function.

A pair of sealing members 30 are affixed to the outer race 14 and extend in a generally radial direction toward the collars 24. More specifically, a radially outward peripheral edge 32 of each of the sealing members 30 is affixed one of the axial ends of the outer race 14 such that the sealing members 30 moves with the outer race 14. In some forms, shields (not explicitly shown in FIGS. 1 and 2) may be attached to the axial ends of the outer race 14 and the sealing members 30 may be affixed to the shields.

Radially inward peripheral edges 34 of the sealing members 30 each contact one of the sealing surfaces 28 of one of the collars 24 to form a sliding seal. The sealing members 30 are spatially arranged and sufficiently elastically deformable such that the radially inward peripheral edge 34 of the sealing member 30 applies a force that is radially and axially inward on the collar 24 to form a seal between each of the sealing members 30 and a corresponding collar 24.

Figure 4:
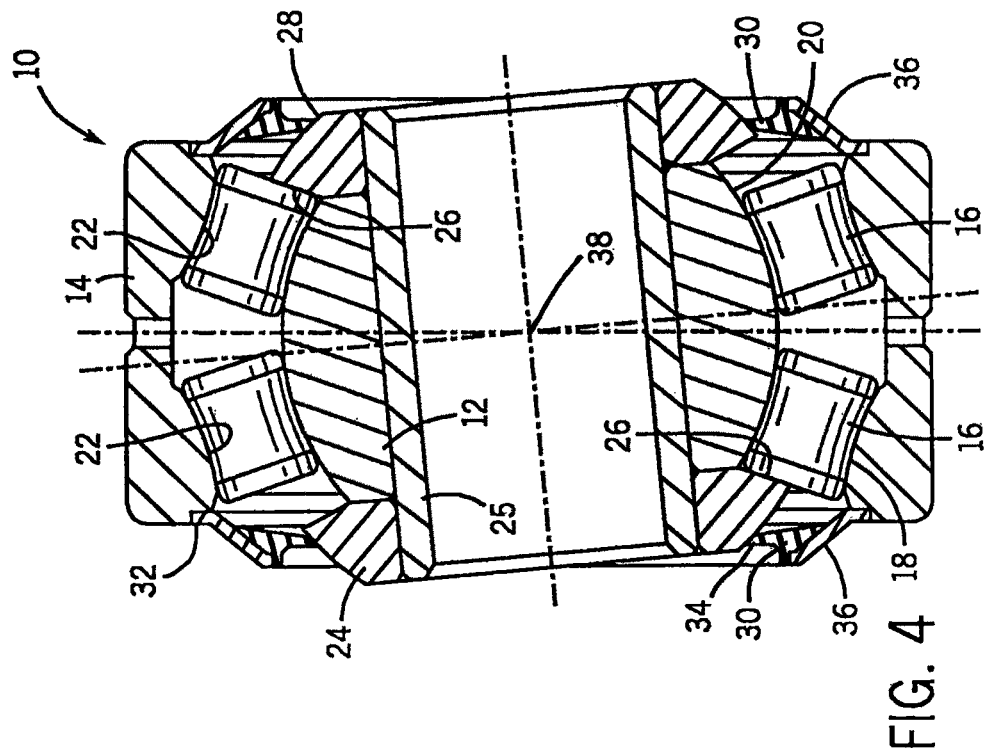
FIG. 4 is a cross-sectional side view of the bearing assembly in a misaligned position.
Figure 3:
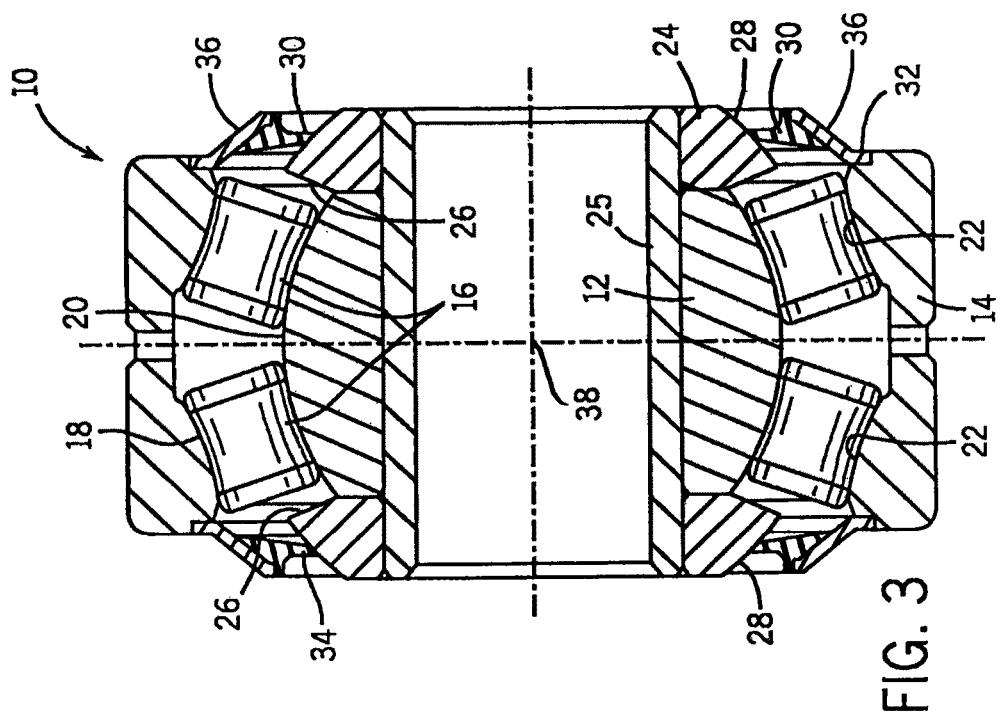
FIG. 3 is a cross-sectional side view of the bearing assembly in an aligned position.

Now with additional reference to FIGS. 3 and 4, an aligned position (FIG. 3) and a misaligned position (FIG. 4) are illustrated. One difference between the depiction of the bearing assembly in FIGS. 3 and 4 and the depiction of the bearing assembly in FIGS. 1 and 2 is that the shields 36 and the sealing members 30 are explicitly identified as separate items. It will be appreciated that, at least in some forms, the seals and shields may be bonded together before being installed in the bearing. In one possible way of making the bearing assembly 10, the sealing members 30 are orbital formed into shield 36.

Notably, FIG. 4 illustrates the operation of the bearing at a 5 degree angle of misalignment. The outer lateral end of one of the roller elements 16 contacts the stop surface 26 of the collar 24 preventing further axial misalignment. Even at this level of misalignment (for the particular geometry shown), the quality of the seal formed between the sealing members 30 and the collar 24 is the same as in the aligned position shown in FIG. 3, given the spherical shape of the sealing surface 28 in the collar 24.

If the outer race 14 tilts relative to the inner race 12 to a misaligned position, then the seals formed between the sealing members 30 and the collars 24 shift to accommodate this new operational position. The quality of the seals are maintained as, as the seal location shifts, the points of contact forming the seal are substantially circular (defined by the radially inward peripheral edge 34) traveling over a spherical surface (defined by the sealing surface 28 of the collar 24). Thus, at least within a predetermined range of motion, no gaps are formed along the seal during misalignment of the inner race 12 and outer race 14 and no new stresses are introduced. Notably, if stresses were differentially created over the seal, then it is possible that when the bearing is in use, the sealing members would be subject to cyclic stress which might fatigue the sealing members and compromise the quality of the seal.

Although ideal geometric conditions may be preferable to ensure the quality of the seal, the components may deviate from the ideal geometry without necessarily compromising the quality of the seal. For example, ideally the convex bearing surface 20 on the inner race 12 as well as the sealing surfaces 28 of the collar 24 would be frusto-spherical and have center points 38 which are substantially identical. However, as the sealing members 30 may be elastically deformable and the range of misalignment over which a suitable seal may be maintained is relatively narrow, some deviation from the ideal geometry may not significantly impact the quality of the seal.

The inner race 12, the outer race 14, the collars 24, and the sealing members 30 (and, in some cases, the shield) define the inner cavity of the bearing assembly 10. This inner cavity may receive additional lubrication, if desired, depending on the tribological qualities of the bearing surfaces. According to some constructions, one or more of the bearing surfaces could be composed of self-lubricating material.

In any event, by forming slidable seals between the sealing surfaces 28 of the collars 24 and the radially inward peripheral edges 34 of the sealing members 30, the entrance of contamination or debris from the outside environment into the inner cavity is minimized. By reducing the rate at which contamination enters the inner cavity, the operational life of the bearing assembly 10 is lengthened. This equates to a significant cost savings as, when a bearing assembly 10 remains operable for a longer time, the overall device in which the bearing assembly 10 is a part does not need to be taken out of service to either replace the bearing assembly 10 or to service the bearing assembly 10.

Thus, a bearing assembly is disclosed in which the bearing assembly maintains a sliding seal between a sealing surface of a collar and sealing member. This bearing assembly provides a seal regardless of whether the bearing assembly is operating in an aligned state or in a misaligned state. By maintaining the seal in the misaligned state, the inner cavity of the bearing assembly is less likely to be contaminated by debris or the like which adversely impacts the performance of the bearing assembly compared to other bearing assemblies.

Further, to the extent that the sealing surface of the collar is shaped to match the rotational path of the radially inward peripheral edge of the sealing member, when the sealing member applies a force in forming the seal, the force of the seal is relatively consistent over the angular range of operation thereby preventing the ingress of fluid or particulate contaminants.

Although a particular configuration for a bearing assembly 10 is depicted in FIGS. 1 through 4, variations may be made. For example, instead of employing roller elements 16 having concave bearing surfaces 18 to allow the bearing assembly 10 to operate in a misaligned state, other types of roller elements may be used. Additionally, certain structural elements may be combined with one another and still achieve the same described functionality. For example, the inner race 12 and the collars 24 may be integrally formed with one another. Moreover, certain structural elements may be relocated without deviating from the spirit of the invention. For example, instead of locating the stop surface 26 on the axially inside edge of the collar 24, a stop surface may be formed centrally as a ridge on the inner race 12 such that the centrally-located ends of the roller elements 16 would contact the ridge if the outer race 14 is tilted a sufficient distance with respect to the inner race 12.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A bearing assembly comprising:
   an inner race;
   an outer race radially spaced from the inner race for receiving roller elements therebetween;
   a collar adjacent the inner race and fixed relative to the inner race and having a frusto-spherical sealing surface; and
   a sealing member fixed relative to the outer race, the sealing member slidably and sealingly engaging the collar axially and radially to maintain a seal between the sealing member and the collar during alignment of the inner race relative to the outer race and a predetermined degree of misalignment of the inner race relative to the outer race.

2. The bearing assembly of claim 1, in which the frusto-spherical sealing surface includes an axially and radially outwardly facing spherical surface, and the sealing member engages the outwardly facing surface to slidably and sealingly engage the collar axially and radially.

3. The bearing assembly of claim 1, wherein the predetermined degree of misalignment is at least 6 degrees.

4. The bearing assembly of claim 1, wherein a shield is affixed to an axial end of the outer race and the sealing member is affixed to the shield.

5. The bearing assembly of claim 4, wherein the sealing member is orbital formed into a groove of the outer race.

6. The bearing assembly of claim 1, wherein, the inner race and the outer race each have a convex bearing surface for engagement with a concave bearing surface of the roller elements.

7. The bearing assembly of claim 1, wherein the seal between the collar and the sealing member substantially prevents contamination of an inner cavity of the bearing between the inner race and the outer race when the bearing assembly operates in a misaligned condition below the predetermined degree of misalignment.

8. The bearing assembly of claim 1, wherein the inner race has a frusto-spherical bearing surface.

9. The bearing assembly of claim 8, wherein the frusto-spherical sealing surface and the frusto-spherical bearing surface share a similar center point.

10. A bearing assembly comprising:
    an inner race;
    an outer race;
    a set of roller elements interposed between the inner race and the outer race, the set of roller elements facilitating a generally axial rotation of the outer race relative to the inner race under both an aligned condition and a misaligned condition;
    a collar positioned adjacent to the inner race and having a frusto-spherical sealing surface; and
    a sealing member linked the outer race, the sealing member slidably contacting the collar so as to form a seal between the collar and the sealing member;
    wherein the collar and sealing member are shaped such that the collar and the sealing member maintain the seal in both the aligned condition and the misaligned condition.

11. The bearing assembly of claim 10, wherein the inner race provides a first axis and the outer race provides a second axis, the aligned condition being a condition in which the first axis and the second axis are co-axial and the misaligned condition being a condition in which the first axis and the second axis are not co-axial with one another.

12. The bearing assembly of claim 11, wherein the collar and the sealing member maintain the seal through a misalignment angle of at least 10 degrees between the first axis and the second axis.

13. The bearing assembly of claim 10, wherein a pair of collars are positioned adjacent the inner race proximate each axial end of the inner race and a pair of sealing members are linked to the outer race proximate each axial end of the outer race.

14. The bearing assembly of claim 10, wherein a shield is affixed to an axial end of the outer race and the sealing member is affixed to the shield.

15. The bearing assembly of claim 10, wherein the set of roller elements have concave bearing surfaces permitting the bearing to operate in a misaligned condition.

16. The bearing assembly of claim 15, wherein the inner race and the outer race each have a convex bearing surface that engages the concave bearing surfaces of the set of roller elements.

17. The bearing assembly of claim 10, wherein the seal between the collar and the sealing member substantially prevent contamination of an inner cavity of the bearing between the inner race and the outer race when the bearing operates in the aligned and misaligned condition.

18. The bearing assembly of claim 10, wherein the frusto-spherical sealing surface contacting the sealing member faces axially and radially outward.

19. The bearing assembly of claim 10, wherein the inner race has a frusto-spherical bearing surface.

20. The bearing assembly of claim 19, wherein the frusto-spherical sealing surface and the frusto-spherical bearing surface share a similar center point.

* * * * *